US008682030B2

(12) United States Patent
Large

(10) Patent No.: US 8,682,030 B2
(45) Date of Patent: Mar. 25, 2014

(54) INTERACTIVE DISPLAY

(75) Inventor: Timothy Large, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 12/889,778

(22) Filed: Sep. 24, 2010

(65) Prior Publication Data

US 2012/0076353 A1 Mar. 29, 2012

(51) Int. Cl.
*G06K 9/00* (2006.01)
(52) U.S. Cl.
USPC .............................. 382/103; 715/863; 353/28
(58) Field of Classification Search
CPC .......... G06K 9/00335; G06K 9/00355; G06F 3/017; G03B 21/56; G03B 21/60; G02B 5/021; G02B 5/0284; G02B 5/12
USPC ............. 382/100, 103, 107; 715/863; 353/21, 353/28, 121, 122; 359/443, 449, 452
See application file for complete search history.

(56) References Cited

U.S. PATENT DOCUMENTS

| 6,157,486 A | 12/2000 | Benson, Jr. et al. ........... 359/498 |
| 6,381,068 B1 * | 4/2002 | Harada et al. ................. 359/443 |
| 6,796,656 B1 | 9/2004 | Dadourian ..................... 353/28 |
| 2001/0017731 A1 | 8/2001 | Smith ........................... 358/530 |
| 2002/0126378 A1 * | 9/2002 | Cho et al. ...................... 359/443 |
| 2008/0013826 A1 | 1/2008 | Hillis et al. .................... 382/154 |
| 2009/0091710 A1 | 4/2009 | Huebner ......................... 353/28 |
| 2009/0116742 A1 | 5/2009 | Nishihara ..................... 382/173 |
| 2009/0219253 A1 | 9/2009 | Izadi et al. .................... 345/173 |
| 2009/0276734 A1 | 11/2009 | Taylor et al. .................. 715/863 |
| 2009/0278799 A1 | 11/2009 | Wilson .......................... 345/158 |
| 2009/0278913 A1 | 11/2009 | Rosenfeld et al. ......... 348/14.16 |

FOREIGN PATENT DOCUMENTS

| CN | 1286761 A | 3/2001 | ............ G02B 5/124 |
| CN | 1525539 A | 9/2004 | ............ H01L 21/31 |
| CN | 1918532 A | 2/2007 | ................ G06F 3/00 |

OTHER PUBLICATIONS

"International Search Report", Mailed Date: May 17, 2012, Application No. PCT/US2011/051141, Filed Date: Sep. 11, 2011, pp. 9.
Izadi, et al., "Going Beyond the Display: A Surface Technology with an Electronically Switchable Diffuser", Retrieved at << http://research.microsoft.com/en-us/um/people/shodges/papers/secondlight_cr3.pdf >>, Proceedings of the 21st annual ACM symposium on User interface software and technology, Oct. 19-22, 2008, pp. 10.

(Continued)

*Primary Examiner* — Andrew W Johns
(74) *Attorney, Agent, or Firm* — Jeremy Snodgrass; Glen Johnson; Micky Minhas

(57) ABSTRACT

Embodiments are disclosed herein that relate to the front-projection of an interactive display. One disclosed embodiment provides an interactive display system comprising a projector and a display screen configured to display an image projected by the projector, the display screen comprising a retroreflective layer and a diffuser layer covering the retroreflective layer, the diffuser layer being configured to diffusely reflect only a portion of light incident on the diffuser layer from the projector such that another portion of light passes through the diffuser layer and is reflected by the retroreflective layer back through the diffuser layer. The interactive display system also comprises a camera configured to capture images of the display screen via light reflected by the retroreflective layer to identify via the images a user gesture performed between the projector and the display screen.

20 Claims, 4 Drawing Sheets

(56) References Cited

OTHER PUBLICATIONS

Walker, et al., "Beneath the Surface", Retrieved at << http://www.walkermobile.com/March_2010_ID_Beneath_the_Surface.pdf>>, 2010, p. 32-34.

"Projection screen", Retrieved at << http://www.absoluteastronomy.com/topics/Projection_screen >>, Jul. 12, 2010, pp. 4.

State Intellectual Property Office of China, Office Action of Chinese Patent Application No. 201110285487.9, Oct. 8, 2013, 10 pages.

* cited by examiner

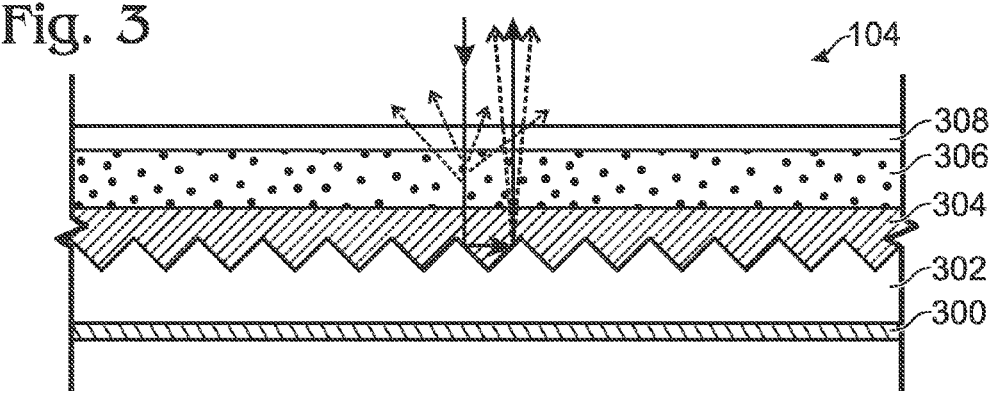
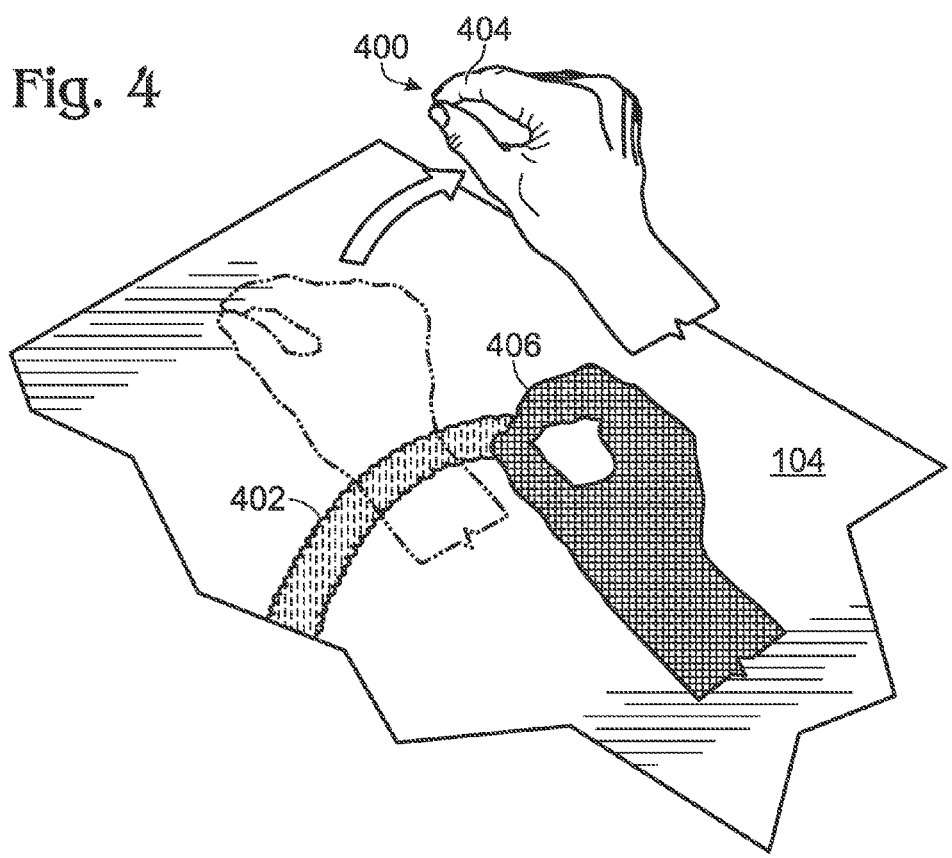

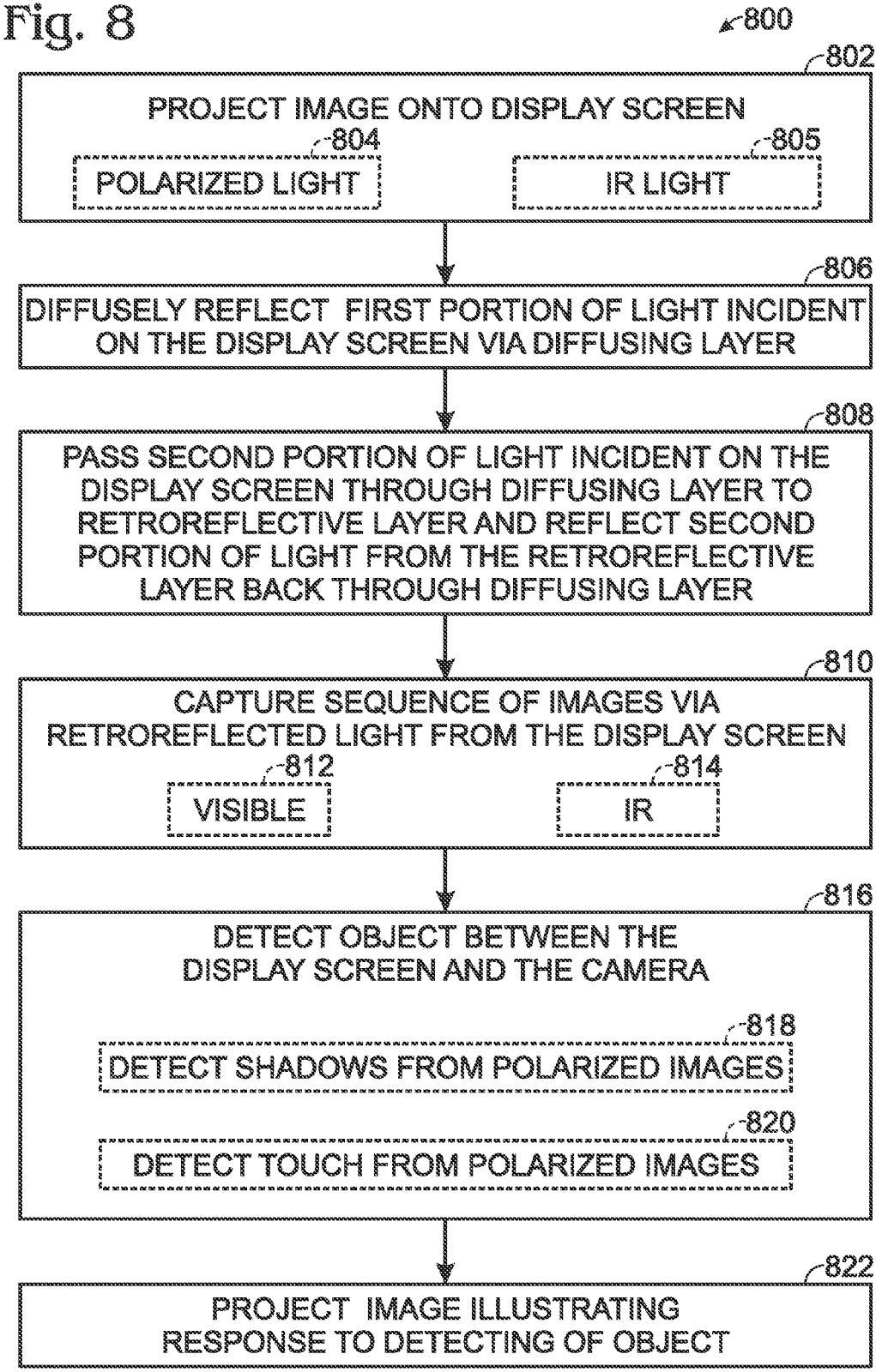

INTERACTIVE DISPLAY

BACKGROUND

An interactive display device, such as a surface computing device, may interact with a user through the surface of an object, as compared to a monitor and keyboard or other such input device. Various types of touch-sensing mechanisms, including but not limited to optical and capacitive touch-sensing mechanisms, may enable the sensing of multiple temporally overlapping touches on the interactive surface. Such touch sensing mechanisms may enable the recognition of touch-based and gesture-based inputs, thereby providing for a rich user experience.

SUMMARY

Various embodiments are disclosed herein that relate to the front-projection of an interactive display. For example, one disclosed embodiment provides an interactive display system comprising a projector, and a display screen configured to display an image projected by the projector, the display screen comprising a retroreflective layer and a diffuser layer covering the retroreflective layer, the diffuser layer being configured to diffusely reflect a first portion of light incident on the diffuser layer from the projector such that a second portion of light passes through the diffuser layer and is reflected by the retroreflective layer back through the diffuser layer. The interactive display system also comprises a camera configured to capture images of the display screen via light reflected by the retroreflective layer, a logic subsystem, and a data storage subsystem storing instructions executable by the logic subsystem to acquire images via the camera and to identify via the images a user gesture performed between the projector and the display screen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a sectional view of an embodiment of a display screen of the embodiment of FIG. 1.

FIG. 4 shows a schematic depiction of a user interacting with an embodiment of an interactive display device.

FIG. 8 shows a flow diagram depicting an embodiment of a method of operating an interactive display device.

DETAILED DESCRIPTION

As mentioned above, interactive display devices may provide for user interaction via a surface of an object, wherein the surface acts both as a display device and as an input interface. For example, some surface computing devices may take the form of a table-like device with a horizontal display surface that is also configured to detect touch inputs. Images may be projected on to the display surface, for example, via a rear projection mechanism, and touch may be detected on the display surface, for example, via one or more infrared cameras positioned behind the surface from the user's perspective.

While a table-like interactive display device may be advantageous for many use environments, other use environments may be less suitable for such a hardware configuration. For example, because the enclosed projection volume for a rear-projection interactive display device may be relatively large, wall-mounting of such a device may be impractical. Further, although cameras are mechanically fixed to the same frame as the projector in such a device, the cameras and projector do not share an optical axis. Thus, there is otherwise no fixed relationship between the scene detected by the infrared cameras and the displayed visible image, which may necessitate alignment during setup and occasional realignment maintenance. Additionally, the object casing that contains the projection volume may add additional expense to the manufacture of such interactive display devices.

Figure 2:
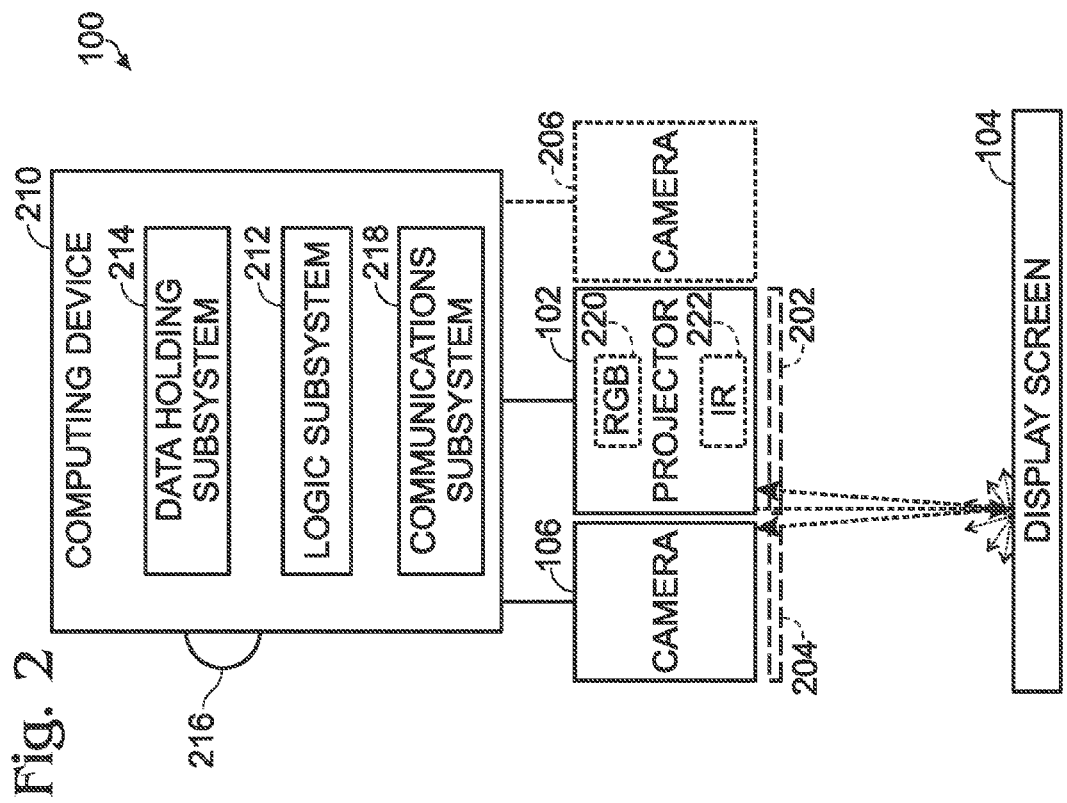
FIG. 2 shows a block diagram of the embodiment of FIG. 1.
Figure 1:
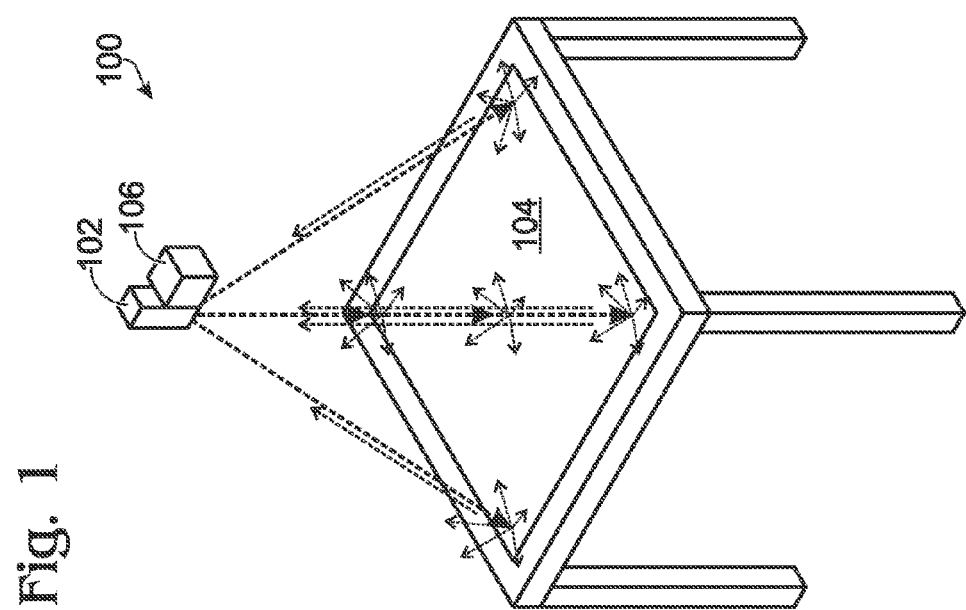
FIG. 1 shows a view of an embodiment of an interactive display device.

Therefore, embodiments are disclosed herein that relate to interactive display devices that utilize front projection to display an interactive image to a user. FIG. 1 shows an embodiment of such an interactive display system 100, and FIG. 2 shows a block diagram of the interactive display system 100. The depicted interactive display system 100 comprises a projector 102 configured to project an image on a display screen 104, and also includes a camera 106 configured to capture an image of the display screen 104. While the display screen 104 is shown as being horizontally oriented and the projector 102 is shown as being positioned over the display screen 104, it will be understood that the projector 102 may have any other suitable positional relationship to the display screen 104. For example, in some use environments, the display screen 104 may be mounted on a wall in a vertical orientation.

As described in more detail below, the display screen 104 comprises a diffuser layer disposed over a retroreflective layer, wherein the term "over" signifies that incident light passes through the diffuser layer before reaching the retroreflective layer. As such, a first portion of light incident on the display screen 104 from the projector is scattered by the diffuser layer, while a second portion passes through the diffuser layer and is reflected back through the diffuser layer and toward the projector 102 and camera 106 by the retroreflective layer. The diffusely reflected light enables projected images to be viewed from a wide range of user positions, while the retroreflected light facilitates optical detection of objects interacting with the system.

In FIG. 1, the diffusely reflected light is illustrated by short arrows extending from the display screen at each illustrated incident light ray, and the retroreflected light is illustrated by a longer arrow extending from the display screen parallel to each incident light ray. In FIG. 2, the retroreflected light is illustrated as two rays that extend from the display screen toward the camera and projector at slight angles to the incident ray. This is to illustrate that a retroreflector may reflect some light that is slightly non-parallel to the incident ray due to slight variations in the reflective surface of the retroreflective layer. Thus, a camera positioned off-axis relative to the axis of the projector may nonetheless detect retroreflected light from the display screen, as long as the camera is positioned at a location to receive this non-parallel retroreflected light.

Referring to FIG. 2, in some embodiments, a polarizer 202 may be utilized to project an image via polarized light. Likewise, a polarization analyzer 204 may be positioned in front of the camera 106. As described in more detail below, this may facilitate shadow detection and/or touch detection on display screen 104. Further, in some embodiments, the interactive display device 100 also may include a second camera 206. The use of the second camera 206 may allow the acquisition of range data, and thereby may allow a distance between a user's hand and the surface of the display screen 104 to be determined.

The interactive display system further comprises a computing device 210 in electrical communication with the projector 102, camera 106 and an optional second camera 206. The computing device 210 includes a logic subsystem 212 and a data-holding subsystem 214. The logic subsystem 212 may include one or more physical devices configured to execute one or more instructions. For example, the logic subsystem may be configured to execute one or more instructions that are part of one or more applications, services, programs, routines, libraries, objects, components, data structures, or other logical constructs to perform the various embodiments of methods disclosed herein, among other tasks. Such instructions may be implemented to perform a task, implement a data type, transform the state of one or more devices, or otherwise arrive at a desired result.

The logic subsystem 212 may include one or more processors that are configured to execute software instructions. Additionally or alternatively, the logic subsystem 212 may include one or more hardware or firmware logic machines configured to execute hardware or firmware instructions. Processors of the logic subsystem 212 may be single core or multicore, and the programs executed thereon may be configured for parallel or distributed processing. The logic subsystem 212 may optionally include individual components that are distributed throughout two or more devices, which may be remotely located and/or configured for coordinated processing. One or more aspects of the logic subsystem 212 may be virtualized and executed by remotely accessible networked computing devices configured in a cloud computing configuration.

The data-holding subsystem 214 may include one or more physical devices configured to hold data and/or instructions executable by the logic subsystem to implement the herein described methods and processes. When such methods and processes are implemented, the state of data-holding subsystem 214 may be transformed (e.g., to hold different data).

The data-holding subsystem 214 may include removable media and/or built-in devices. The data-holding subsystem 214 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 214 may include devices with one or more of the following characteristics: volatile, nonvolatile, dynamic, static, read/write, read-only, random access, sequential access, location addressable, file addressable, and content addressable. In some embodiments, the logic subsystem 212 and the data-holding subsystem 214 may be integrated into one or more common devices, such as an application specific integrated circuit or a system on a chip.

FIG. 2 also shows an aspect of the data-holding subsystem in the form of one or more removable computer-readable storage media 216, which may be used to store and/or transfer data and/or instructions executable to implement the herein described methods and processes. The removable computer-readable storage media 216 may take the form of CDs, DVDs, HD-DVDs, Blu-Ray Discs, EEPROMs, and/or floppy disks, among others.

The projector 102 may be used to present a visual representation of data held by the data-holding subsystem 214. As the herein described methods and processes change the data held by the data-holding subsystem, and thus transform the state of the data-holding subsystem, the state of the projector 102 may likewise be transformed to visually represent changes in the underlying data on the display screen 104.

The computing device 210 may further include other components, such as a communication subsystem 218. When included, the communication subsystem 218 may be configured to communicatively couple computing system with one or more other computing devices, and may include wired and/or wireless communication devices compatible with one or more different communication protocols. As nonlimiting examples, the communication subsystem 218 may be configured for communication via a wireless telephone network, a wireless local area network, a wired local area network, a wireless wide area network, a wired wide area network, etc. In some embodiments, such a communication subsystem 218 may allow the computing device 210 to send and/or receive messages to and/or from other devices via a network such as the Internet.

As mentioned above, the display screen 114 is configured to diffusely reflect a first portion of light while retroreflecting another portion of light. FIG. 3 illustrates a sectional view of an embodiment of a display screen 104 for displaying a front-projected image in an interactive display device. The depicted front projection display screen comprises a backing layer 300 that supports a retroreflective layer 302. An adhesive layer 304 (or other suitable layer) is disposed between the retroreflective layer 302 and a diffuser layer 306. Further, a surface layer 308 may be disposed over the diffuser layer to achieve desired surface characteristics, such as strength, damage resistance, tactile properties, etc.

The diffuser layer 306 and retroreflective layer 302 cooperate to diffusely reflect a first portion of incident light so that a projected image has a suitable brightness and intensity distribution for viewing from a range of user positions, and to retroreflect a second portion of light back toward the projector and camera(s) to facilitate detection of objects in front of the display. As such, objects disposed between the projector and display screen will appear as shadows in front of the screen, as such objects are not retroreflective. Even white paper placed on the display screen may be easily distinguished from the white diffuser layer 306 due to the shadow caused by the white paper blocking light from reaching the retroreflective layer behind it.

Any suitable retroreflecting structure may be used as retroreflective layer 302. In one example, a retroreflective layer may be formed by embossing corner cubes onto a PET film to form an array of prisms. In general, retroreflective materials can have arbitrarily large screen gains (i.e. the proportion of light travelling back to the projector, as a fraction of that that would travel back to the projector from a diffuse screen). Thus, the retroreflective layer 302 may be configured to have any suitable gain, including but not limited to gains of 1000 or more. It will be understood that retroreflective layers with gains lower than 1000 also may be used. Examples of suitable retroreflective layers include, but are not limited to, Micro-Structured Reflective Materials manufactured by the Reflexite Display Optics Corporation of Avon, Conn.

The diffuser layer 306 likewise may have any suitable configuration. For example, the diffuser layer 306 may comprise a screen-printed pattern of white dots on a substrate, a layer of a suitable white fabric, and/or any other suitable diffusing structure. The diffuser layer 306 may be configured to diffusely reflect any suitable proportion of incident light. Suitable proportions of incident light include proportions sufficient to achieve a desired brightness of a projected image across a range of viewing angles, and also to allow a suitable portion of light to be retroreflected back toward the projector and camera. In specific embodiments, the diffuser layer 306 may be configured to diffusely reflect between 60-90% of incident light, such that between 10-40% of incident light is reflected by the retroreflective layer 302. It will be understood that ranges described above are presented for the purpose of example, and are not intended to be limiting in any manner.

In the specific example of a display screen that diffuses 90% of incident light and retroreflects 10% of incident light with a gain of ~1000, the light intensity viewed at the projector is about 100 times as bright as the diffusely reflected light viewed by a viewer due to the gain of the retroreflector more than countering the diffuse reflection of the diffuser layer. As a consequence, the camera sees a much brighter image of the projected light than a user. Further, as mentioned above, because objects placed in front of the screen are not retroreflective and return a relatively small amount of light to the camera, such objects appear dark to the camera, regardless of the color, surface texture, and/or color of the objects.

It will be understood that system performance may be a function of other variables than an amount of light diffusely reflected as compared to retroreflected. Examples of such variables include projector output power, display screen area, display luminance, retroreflector gain, ambient illuminance, non-retroreflected ambient. Table 1 below shows example values for such variables that may lead to a contrast ratio of diffusely reflected light from a sheet of white paper on a display screen compared to retroreflected light from the display screen, wherein the example values lead to a contrast ratio of approximately nine. In some embodiments, a contrast ratio of greater than 2 may allow for adequate vision system performance. However, it will be understood that contrast ratios below 2 also may be utilized in some environments and applications. It will be understood that these values are presented for the purpose of example, and are not intended to be limiting in any manner.

TABLE 1

| Variable | Value |
| --- | --- |
| Projector output power | 2000 lumen |
| Display area | 1 sq. meter |
| Fraction of projected light retroreflected | 0.02 |
| Fraction of projected light scattered | 0.98 |
| Display luminance | 1960 lumen/sq. meter |
| Retroreflector gain | 500 |
| Ambient illuminance | 150 lumen/sq. meter |
| Non-retroreflected ambient illuminance | 147 lumen/sq. meter |
| Irradiance from white paper | 671 |
| Irradiance from retroreflector | 6366 |
| Contrast ratio | ~9 |

The display screen 104 may have any suitable shape and orientation. For example, the display screen 104 may be flat, or may have surface contours. Further, the display screen 104 may be horizontally disposed (e.g. as the surface of a table), vertically disposed (e.g. mounted on a wall), or have any other suitable orientation relative to the projector 102. Further, the projector 102 may have any suitable location and orientation relative to the display screen 104, and may or may not project light onto the screen in a direction normal to the screen.

The camera 106 may have any suitable position relative to the projector at which the camera 106 can detect retroreflected light of a suitable intensity to allow for object detection. It will be understood that an amount of retroreflected light that reaches the camera 106 may be a function of an accuracy of the retroreflective layer 302 and position of the camera 106. The term "accuracy" as used to describe the retroreflective layer refers to the angular intensity distribution and width of the light cone reflected by the retroreflective layer, wherein a more accurate retroreflective layer reflects directs a narrower cone of light and/or more reflected light in a direction parallel to the incident light, while a less accurate retroreflective layer reflects a wider cone of light with a lower intensity parallel to the incident light.

In some embodiments, the camera 106 may share a common optical axis with the projector. This may help to provide for a bright, high-contrast image of objects in front of the display screen. It will be understood that, in such embodiments, a beam splitter and other such optics may be used to redirect light received from the retroreflector toward the camera.

In other embodiments, as depicted in FIGS. 1 and 2, the camera 106 may be placed close to the projector 102 such that the optical axes of the projector and camera are spatially close but not common. In this case, the use of a somewhat less accurate retroreflective layer may allow more light to reach the camera 106. This may allow the omission of beam splitters and other such optics that would otherwise be used to configure a common optical axis for the projector 102 and the camera 106. In such embodiments, placing the camera 106 close to the projector 102 may help to avoid parallax error in the images acquired by the camera 106.

As described above, objects placed between the projector 102 and the display screen 104 appear dark in images acquired by the camera 106. Thus, a user may interact with the interactive display system 100 via gestures (motions and/or postures) made between the projector 102 and the display screen 104. As an example of a gesture, a pinch posture made by a user's hand may appear as a dark hoop to the camera. As further examples, a hand outstretched may represent a holding gesture, while a pointing finger may represent a pushing gesture. Thus, the movement of such postures across the display may be interpreted as different inputs by the computing device 210, and may evoke different responses from the computing device.

Figure 5:
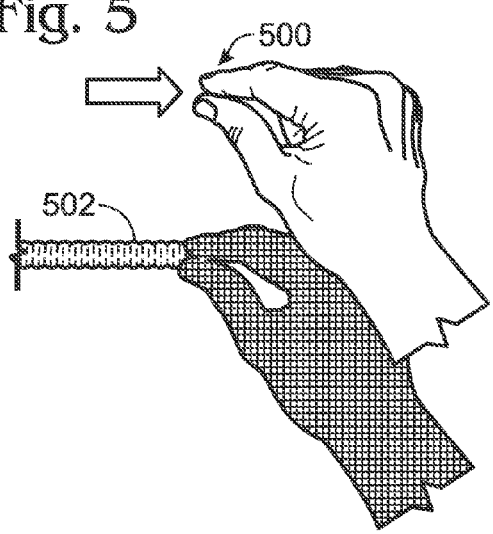
FIGS. 5-6 show another schematic depiction of a user interacting with an embodiment of an interactive display device.
Figure 6:
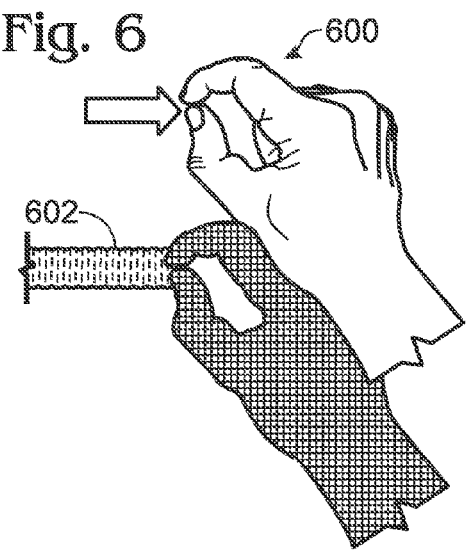

FIGS. 4-6 illustrate examples of interactions of a user with the interactive display system 100 via gestures made over the display screen 104. First, FIG. 4 illustrates a pinch gesture 400 used to draw a line 402 across the display screen 104. As mentioned above, the user's hand posture appears to the camera 106 as a dark hoop over the display screen 104. Because there is no substantial parallax error between the user's fingers 404 and the display surface, the computing device 210 may be configured to generate and display a response image such that a visual response to the gesture is displayed at the location of the shadow 406 of the user's fingers 404. This is illustrated in FIG. 4 as a line 402 emerging from the shadow 406 of the user's fingers as the user moves the "pinch" gesture across the display screen 104. It will be understood that a user may cease drawing the line by opening fingers 404 to stop the "pinch" gesture, for example.

FIGS. 5 and 6 illustrate other example interactions of a user with the interactive display system 100. First referring to FIG. 5, the user performs a "narrow pinch" gesture 500 such that the hoop formed by the user's hand has a relatively narrower width. In response, the computing device 210 may generate a display of a relatively narrower line 502 that follows the user's fingers. Next referring to FIG. 6, the user performs a "wide pinch" gesture 600 such that the hoop formed by the user's hand has a relatively wider width. In response, the computing device 210 may generate a display of a relatively wider line 602 that follows the user's fingers. Thus, the image contrast provided by the retroreflective layer 302 compared to an object placed in front of the display screen 104 may allow relatively fine distinctions to be made as a user dynamically changes posture while performing a gesture, and also allow visual feedback provided to a user based upon such changes in hand posture to be made dynamically.

The computing device 210 also may be configured to respond to and interact with objects other than a user's hands. For example, if an object placed over the display screen 104 is detected in the image data, the computing device 210 may remove the portion of the projected image outlined by the object and replace that portion with another image. As a more specific example, the computing device 210 may be configured to project writing onto a blank sheet of paper detected on the display screen 104. Likewise, a blank book may have images projected onto it.

In another embodiment, an IR (infrared) light source may be added to the projector 102. For example, where the projector 102 is powered by LED light sources 220 (depicted as RGB sources), an IR (infrared) LED light source 222 may be added. LED projectors may be field sequential in that they show sequential red, green and blue images. If an IR LED 222 is added, a fourth frame may be added into the sequence, wherein the fourth frame is IR instead of red, green or blue. In this manner, the IR frame could be a uniform bright IR image, thereby providing a uniform background. This may help to provide more certainty regarding the identification of objects in images from the camera 106 compared to where objects are located in front of a background of visible non-uniform projected images. This also may enable object detection even where a true black image is displayed by the projector. In another embodiment, the computing device 210 may be configured to compress the dynamic range of projected images so that true black portions of an image are modified not to be true black. The term "true black" as used herein signifies portions of an image in which insufficient light is retroreflected to be detectable by the camera. While the infrared light source of the depicted embodiment is shown as residing inside the projector, it will be understood that the infrared light source may have any other suitable location, and that a camera configured to detect retroreflected infrared light may likewise have any suitable location.

As mentioned above, in some embodiments, a second camera 206 may be added to help acquire range information. For example, where the second camera 206 is located off-axis relative to the first camera 106 and projector 102 (e.g. such that the second camera does not receive retroreflected light), then range information (e.g. a distance between an object in the field of view of the cameras and the display screen 104) may be determined by a comparison of the retroreflected image from the first camera 106 and the diffuse image from the second camera 206.

As mentioned above, in some embodiments the interactive display device 100 may be configured to project images via polarized light. The retroreflective layer 302 rotates the plane of polarization of polarized light, whereas the diffuser layer 306 removes polarization. Therefore, by using a switchable analyzer, a pair of orthogonally polarized cameras, or other such arrangement, the shadow of objects placed on or over the surface of the display screen 104 may be distinguished from the objects themselves. This may help to achieve more accurate interactions with objects.

Figure 7:
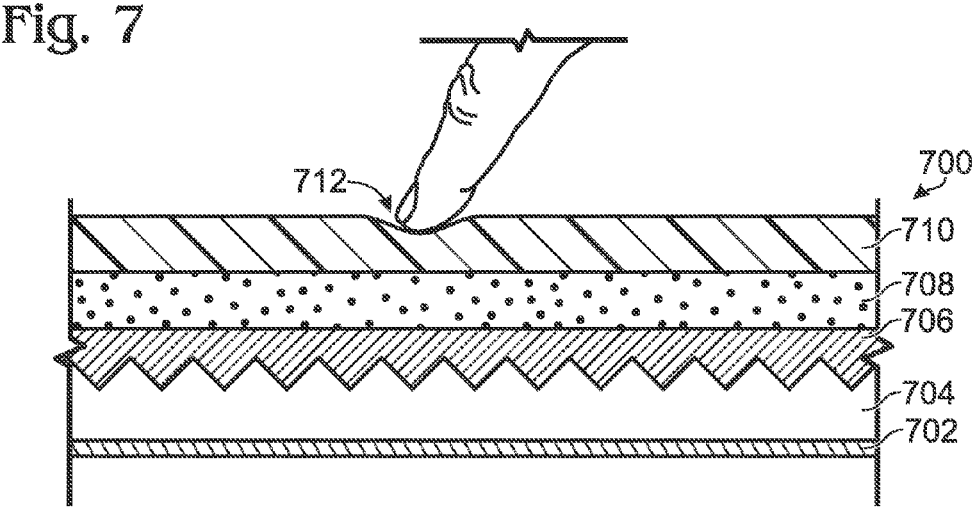
FIG. 7 shows a sectional view of another embodiment of a display screen for use in a front-projection interactive display device.

In some embodiments, polarized light also may be used to distinguish objects touching the display screen 104 from objects located over the display screen 104. For example, the display screen may include a layer of a material exhibiting high stress-induced birefringence. Examples of such materials include elastomers such as polyurethane, silicone rubbers, and vinyl rubbers. Such materials modify a polarization of (e.g. rotates and/or depolarizes) light passing through the layer when the layer is deformed due to a touch. FIG. 7 shows an example embodiment of such a front projection display screen 700. Display screen 700 comprises a backing layer 702 supporting a retroreflective layer 704, and an adhesive layer 706 or the like attaching a diffuser layer 708 to the retroreflective layer 704. Further, a layer of a material exhibiting high stress-induced birefringence 710 is disposed over the diffuser layer 708.

The layer of a material exhibiting high stress-induced birefringence 710 does not alter the polarization of light passing through when the layer is not deformed, but does alter the polarization of light passing through when the layer is deformed by a touch, as illustrated at 712. Therefore, when viewed through an appropriately oriented polarization analyzer, polarized incident light that is reflected from the retroreflective layer 704 may have a lesser intensity in the vicinity of a touch than in areas unaffected by the touch.

FIG. 8 shows a flow diagram depicting an embodiment of a method 800 of operating an interactive display device. Method 800 comprises, at 802, projecting an image onto a front projection display screen via a projector. As described above and as indicated at 804, the projected light may be polarized in some embodiments to aid with shadow and/or touch detection. Further, as described above and indicated at 805, IR images may be periodically projected in addition to visible images.

Method 800 further comprises, at 806, diffusely reflecting a first portion of light incident on the display screen via a diffuser layer of the display screen, and at 808, passing a second portion of light incident on the display screen through the diffuser layer to a retroreflective layer and then from the retroreflective layer back through the diffuser layer to exit the display screen. Any suitable proportions of incident light may be diffused and retroreflected from the display screen. For example, in some embodiments, the second portion of light comprises 10-40% of light received on the display screen from the projector, and the first portion of light comprises 60-90% of incident light. It will be understood that these ranges are presented for the purpose of example, and are not intended to be limiting in any manner.

Method 800 next comprises, at 810, capturing with a camera a sequence of images via retroreflected light from the display screen. The images acquired by the camera may be visible images, as indicated at 812, and/or infrared images, as indicated at 814. Then, at 816, method 800 comprises detecting, from the sequence of images, an object between the display screen and the camera. The object may comprise a user's hand or arm, an inanimate object, combinations of animate and inanimate objects, etc. Additionally, user gestures, movements of objects, and other temporally varying interactions may be detected from the series of images. It will be understood that images may be detected via two or more cameras, as described above, to detect range information.

Further, multiple temporally overlapping interactions may be detected from the series of images. Also, where the projector projects polarized images, a polarization analyzer and/or other appropriate optics may be utilized to detect object shadows, as indicated at 818, and/or touch information as indicated at 820 (e.g. by a decrease in reflected intensity due to the deformation of a layer of a material exhibiting high stress-induced birefringence on the display screen).

Continuing, method 800 comprises, at 822, projecting onto the display screen an image illustrating a response to detecting the object. Any suitable image or images may be projected in response to detecting the object. For example, graphical virtual objects in a projected image, such as lines, shapes, text, icons, images, backgrounds, etc., may be added, modified, moved, and/or deleted in response to a detected object; an application may launch or quit; playback of a media file may commence or cease; and/or any other suitable response may be projected onto the display. It will be understood that these specific user interactions are presented for the purpose of example, and are not intended to be limiting in any manner.

An interactive display device according to the embodiments described herein may provide cost-effective installation in a variety of orientations and use environments. It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interactive display system, comprising:
   a projector configured to project visible light;
   a display screen configured to display an image projected by the projector, the display screen comprising
      a retroreflective layer, and
      a diffuser layer covering the retroreflective layer, the diffuser layer being configured to diffusely reflect a first portion of the visible light incident on the diffuser layer from the projector such that a second portion of the visible light passes through the diffuser layer and is reflected by the retroreflective layer back through the diffuser layer;
   a camera positioned to capture images of the display screen from a location at which the camera receives visible light from the projector reflected by the retroreflective layer;
   a logic subsystem; and
   a data storage subsystem storing instructions executable by the logic subsystem to acquire images via the camera and to identify, via the images, a user gesture performed between the projector and the display screen.

2. The system of claim 1, wherein the camera is configured to acquire a visible image of the display screen.

3. The system of claim 1, wherein the diffuser layer is configured to diffusely reflect 60-90% of visible light incident on the display screen from the projector, and to allow 10-40% of visible light incident on the display screen from the projector to be reflected by the retroreflective layer.

4. The system of claim 1, wherein the instructions are executable to compress a dynamic range of a projected image to modify true black portions of the projected image so as not to be true black.

5. The system of claim 1, wherein the camera is a first camera, and further comprising a second camera configured to capture an image of the display screen from a different position than the first camera.

6. The system of claim 1, wherein the projector is configured to project polarized visible light, and wherein the system further comprises a polarization analyzer positioned between the display screen and the camera.

7. The system of claim 1, further comprising an infrared light source configured to project infrared light onto the display screen, and wherein the camera is configured to detect infrared light.

8. The system of claim 7, wherein the display screen further comprises a layer comprising one or more of a polyurethane, a silicone rubber, and a vinyl rubber.

9. The system of claim 1, wherein the logic subsystem is configured to display via the projector a response to a user gesture.

10. A front projection display screen for displaying a projected image, the display screen comprising:
    a retroreflective layer, and
    a diffuser layer covering the retroreflective layer, the diffuser layer being configured to diffusely reflect 50-90% of light incident on the display screen from a projector such that 10-40% of light incident on the display screen is reflected by the retroreflective layer.

11. The display screen of claim 10, wherein the diffuser layer is configured to diffusely reflect 60-90% of light incident on the display screen and to reflect 10-40% of light back toward a source of the light.

12. The display screen of claim 10, further comprising an adhesive layer between the diffuser layer and the retroreflective layer.

13. The display screen of claim 10, further comprising a backing layer that supports the retroreflective layer.

14. The display screen of claim 10, further comprising a silicone layer disposed over the diffuser layer.

15. A method of operating an interactive display system, the method comprising:
    projecting an image onto a display screen via a projector;
    diffusing a first portion of light incident on the display screen via a diffuser layer of the display screen;
    passing a second portion of light incident on the display screen through the diffuser layer to a retroreflective layer and then reflecting the second portion of light from the retroreflective layer back through the diffuser layer, wherein the second portion of light comprises 10-40% of light received on the display screen from the projector;
    capturing via a camera a sequence of images via light retroreflected from the display screen;
    from the sequence of images of the display screen, detecting an object between the display screen and the camera; and
    projecting onto the display screen an image illustrating a response to detecting of the object.

16. The method of claim 15, wherein capturing the sequence of images comprises capturing a sequence of visible images.

17. The method of claim 15, wherein capturing the sequence of images comprises capturing a sequence of images via two or more cameras.

18. The method of claim 15, wherein diffusing the first portion of light incident on the display screen comprises diffusing 60-90% of light incident on the display screen.

19. The method of claim 15, wherein projecting images comprises projecting polarized light, and wherein capturing images comprises utilizing a polarization analyzer between the display screen and the camera.

20. The method of claim 19, wherein projecting images comprises projecting polarized light, and wherein capturing images comprises detecting a decrease in intensity due to a deformation of a layer comprising one or more of a polyurethane, a silicone rubber, and a vinyl rubber.

* * * * *